D. H. COOPER.
Pitman-Connection and Crank-Pin.
No. 215,795. Patented May 27, 1879.
Fig 1.
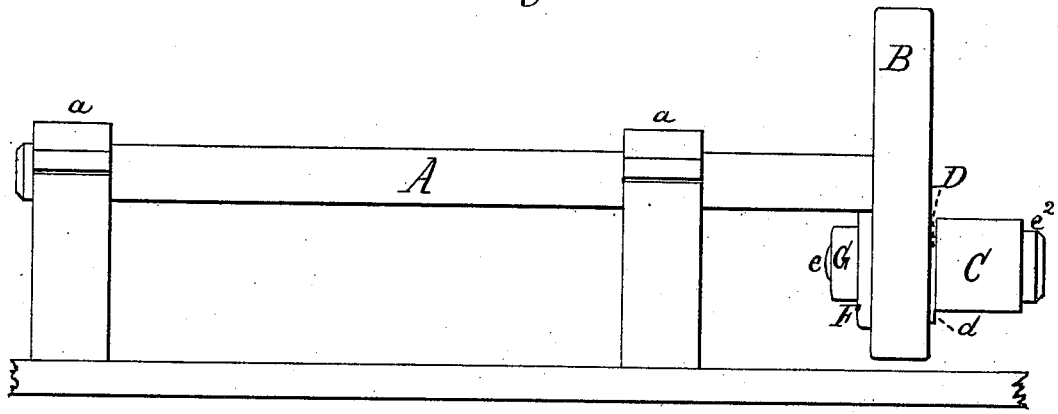
Fig 2.     Fig 3.     Fig 4.
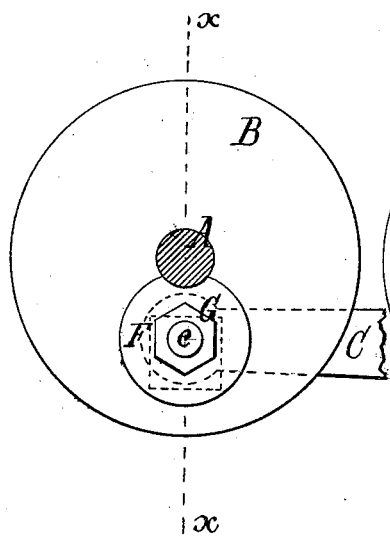 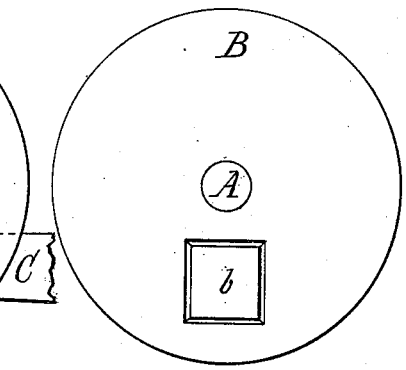 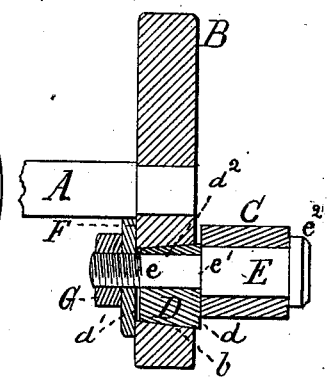
Fig 5.
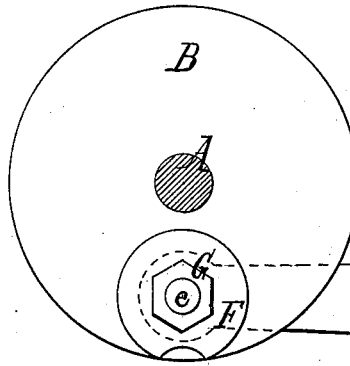
Witnesses:
J. P. Th. Lang.
G. H. Theodore Lang.
Inventor:
Dana H. Cooper
by
Mason Fenwick & Lawrence
Attys

UNITED STATES PATENT OFFICE.

DANA H. COOPER, OF MOUNT CARMEL, CONNECTICUT.

IMPROVEMENT IN PITMAN-CONNECTIONS AND CRANK-PINS.

Specification forming part of Letters Patent No. 215,795, dated May 27, 1879; application filed December 2, 1878.

*To all whom it may concern:*

Be it known that I, DANA H. COOPER, of Mount Carmel, in the county of New Haven and State of Connecticut, have invented a new and useful Improvement in Crank and Pitman Connections; and I do hereby declare that the following is a full, clear, and exact description of the same, reference being had to the accompanying drawings, forming part of this specification, in which—

Figure 1 is a side elevation of a crank-shaft provided with my improved crank and pitman connection. Fig. 2 is a back view of the same, showing the shaft in section. Fig. 3 is a front view of the crank-plate, the crank-pin being removed. Fig. 4 is a vertical section of the parts shown in Fig. 1 in the line $x\,x$ of Fig. 2. Fig. 5 is a back view of the same, showing the crank-pin adjusted to a different position from that shown in Fig. 2.

My invention relates specially to pitman-connections and crank-pins of harvesting-machines, and is designed to adjust the throw of the sickle-bar when the sickle-knives become inoperative from wear in use and from being ground to make them sharp, the adjustments effected being in proportion to the reduction in width of the knives; and thus the entrance of the knives into the guard-fingers is insured.

The nature of the first part of my invention consists in a crank plate or arm provided with a square or other many-sided hole through it, in connection with a crank-pin applied in an eccentric manner in a many-sided stock, whereby the stroke of the crank arm or plate may be varied in length by taking the stock out of the hole in the crank plate or arm, turning it one-quarter or one-half around, or to the extent required, and again inserting it in the said hole, and whereby also the adjusted crank-pin may be rigidly fastened in position.

The nature of the third part of my invention consists in a crank-pin made separate from the stock, and provided with a shoulder at its outer end, and with a reduced stem-screw threaded near its inner end, in combination with the perforated stock and a nut and washer, whereby the pitman and stock and crank-pin can be connected together in a very firm manner and very expeditiously by a single nut and washer on the inner end of the crank-pin, and disconnected with great convenience.

By the first part of my invention casual change of the stroke of the crank plate or arm from undue strain or other causes is avoided. Such change often occurs in contrivances which depend upon the pressure or friction of a nut against a slotted plate.

By the second part of my invention the crank-pin adapted for being applied eccentrically in the stock can be inserted through the solid head of a pitman, and confined in position by a single nut and washer on its inner end, and thus the necessity of having the outer end of said pin removable, or provided with a screw-thread, washer, and nut, is avoided, which construction, although objectionable and expensive, would be necessary if the crank-pin and stock were made inseparable or in one piece.

In the accompanying drawings, A represents a shaft, having bearings $a$; B, a crank plate or arm, and C a pitman. The crank plate or arm B is provided eccentrically with a square or other many-sided hole, $b$, the sides of which are inclined to each other in a rearward direction, as shown in Figs. 3 and 4. Into the hole $b$ a square or other many-sided stock, D, is so fitted that its larger end face, $d$, projects outward from the crank-plate B, and its smaller end face, $d^1$, stands back from the rear side of the crank-plate.

The stock D is provided with a hole, $d^2$, running through it parallel with its axis, and in an eccentric position to the axis of the stock. Through this hole the reduced screw end $e$ of a crank-pin, E, is passed. The pin E fits the hole snugly, and its ends stand out beyond the faces of the crank-plate far enough to receive, respectively, the pitman C and the washer F and nut G as shown.

The shoulder $e^1$ of the main body of the crank-pin bears against the end face $d$ of the stock.

The washer and nut, F and G, are applied on the screw-threaded end $e$ of the pin, and the washer bears against the rear of the crank-plate, the washer completely closing the hole $d^2$. The nut and washer serve for drawing the stock D up into the hole $b$ in such a manner that the tapering sides of the stock bind with a wedging action against the side walls of the hole $d^2$.

The crank-pin E is provided with a shoulder or head, $e^2$, between which and the larger end of the stock D the head of the pitman C is confined; and thus when the pitman-head wears away on its edges it can be compensated for by tightening up the nut G, this operation causing the stock, crank-pin, and pitman-head to bind more closely together; but previously to this adjustment being made the pin E must be turned off a sufficient amount at the shoulder $e^1$.

Operation: When the head of a pitman, C, is to be attached to the crank-pin E, the nut G and washer F are removed, and the crank-pin E driven out of the stock D, and its smaller end passed through the head of the pitman until the pitman-head abuts against the shoulder $e^2$. This done the crank-pin has its smaller end reinserted in the stock D, and the stock with it reinserted into the hole of the crank-plate, and the whole fastened together by the washer and nut, F G, as shown.

If the stroke of the crank-pin is to be changed from that shown in Fig. 2 to that shown in Fig. 5, the nut and washer are removed and the stock D is taken out of the hole $b$ and turned one-quarter around, and then reinserted in the hole $b$ and fastened by the washer, nut, and screw end of the crank-pin, as shown.

By means of the devices described and shown four distinct adjustments of the stroke of the crank are obtained, and by using pyramidical-shaped stocks with five, six, or more sides—such stocks having the crank-pins set eccentrically in them—five, six, or more distinct adjustments of the stroke may be obtained.

I have referred to pitmen of harvesters specially in this specification; but I do not wish to be understood as limiting the use of my invention thereto, as it is obvious that many other useful applications can be made thereof to other machinery employing pitman-connections.

In carrying out my invention it might be desirable to dispense with the screw-thread on the end $e$ of the pin, and in lieu thereof cut a slot for a wedge-key in the pin. This would dispense with the use of the nut G. Such modification would be the equivalent of the nut and screw.

What I claim is—

1. The combination of a crank-plate or crank-arm having a many-sided hole through it and a crank-pin set eccentrically in a many-sided stock, which is confined in said hole by a nut and screw, substantially as and for the purpose described.

2. The combination of the crank-pin E, having a shoulder or head, $e^2$, and with a screw end, $e$, and the stock D, having an eccentric hole, $d^2$, parallel with its axis, whereby the crank-pin may be inserted into a solid pitman-head and confined by the nut G, substantially as described.

DANA H. COOPER.

Witnesses:
GEORGE H. CADWELL,
ELLSWORTH B. COOPER.